(12) United States Patent
Iwaki et al.

(10) Patent No.: US 6,701,782 B2
(45) Date of Patent: Mar. 9, 2004

(54) FLOW SENSOR

(75) Inventors: Takao Iwaki, Chiryu (JP); Toshimasa Yamamoto, Bisai (JP); Hiroyuki Wado, Toyota (JP); Yukihiro Takeuchi, Nishikamo-gun (JP)

(73) Assignee: Denso Corporation, Aichi-Pref. (JP)

( * ) Notice: Subject to any disclaimer, the term of this patent is extended or adjusted under 35 U.S.C. 154(b) by 0 days.

(21) Appl. No.: 10/199,116

(22) Filed: Jul. 22, 2002

(65) Prior Publication Data
US 2003/0019290 A1 Jan. 30, 2003

(30) Foreign Application Priority Data
Jul. 27, 2001 (JP) .......... 2001-228246

(51) Int. Cl.⁷ .............. G01F 1/68
(52) U.S. Cl. ................ 73/204.26
(58) Field of Search ........ 73/204.26, 204.11, 73/31.06; 257/639, 640

(56) References Cited

U.S. PATENT DOCUMENTS

| | | | | |
|---|---|---|---|---|
| 5,393,351 A | * | 2/1995 | Kinard et al. | 136/225 |
| 5,428,244 A | * | 6/1995 | Segawa et al. | 257/646 |
| 5,627,403 A | * | 5/1997 | Bacchetta et al. | 257/639 |
| 5,659,127 A | * | 8/1997 | Shie et al. | 73/31.05 |
| 5,804,462 A | * | 9/1998 | Liu et al. | 438/53 |
| 5,815,223 A | * | 9/1998 | Watanabe et al. | 349/42 |
| 6,240,777 B1 | * | 6/2001 | Treutler et al. | 73/204.26 |

FOREIGN PATENT DOCUMENTS

| | | |
|---|---|---|
| JP | A-5-264566 | 10/1993 |
| JP | A-10-260068 | 9/1998 |
| JP | A-2001-21401 | 1/2001 |

* cited by examiner

*Primary Examiner*—Edward Lefkowitz
*Assistant Examiner*—Jewel Thompson
(74) *Attorney, Agent, or Firm*—Nixon & Vanderhye PC

(57) ABSTRACT

A flow sensor, which includes a diaphragm, is made such that the diaphragm is flat or outwardly deformed to allow fluid flow rate measurements at higher flow rates. The diaphragm is made of an upper set of insulating films, electric devices, and a lower set of insulating films. The component layers of the diaphragm are formed such that the average stress in the upper set of insulating films is more compressive than the average stress in the lower set of insulating films.

24 Claims, 9 Drawing Sheets

FLOW SENSOR

CROSS REFERENCE TO RELATED APPLICATION

This application relates to and incorporates by reference Japanese patent application No. 2001-228246, which was filed on Jul. 27, 2001.

BACKGROUND OF THE INVENTION

The present invention relates to a flow sensor, and more particularly, to a flow sensor having a diaphragm made of component layers.

A flow sensor shown in Japanese unexamined patent publication Hei 11-194043 includes a lower film having a low level of tensile stress and an upper film that also has a low level of tensile stress. In other words, the upper film (above the device) and the lower film (below the device) have almost the same levels of stress.

In this previous invention, the sets of films above and below the device have low levels of tensile stress, because the higher the tensile stress in the entire film, the lower the film's resistance to pressure. Compressive stress in the film, on the other hand, makes the film buckle. Therefore, the entire film has a weak tensile stress to maximize the film's resistance to pressure, while ensuring that the film does not buckle. The long-term stability of the sensor is ensured with low levels of tensile stress in both the upper film and the lower film of the device.

In general, the upper and lower films in such a device consist of combinations of silicon nitride films and silicon oxide films. Silicon nitride films tend to have tensile stress, while silicon oxide films tend to have compressive stress. It is possible to adjust the stress in the upper and lower films of the device to desired levels by adjusting the relative thicknesses of the silicon nitride films and the silicon oxide films in order to achieve low levels of tensile stress. In order to ensure low levels of tensile stress in both the upper and the lower films of the device, each of the upper film and the lower film of the device must include both an oxide film and a nitride film, and the thickness of the oxide film and the thickness of the nitride film must be equal. In other words, the following equation 1 would apply:

(Total thickness of the nitride film in the upper film)/(Total thickness of the oxide film in the upper film)=(Total thickness of the nitride film in the lower film)/(Total thickness of the oxide film in the lower film)

Flow sensors for measuring high flow rates are susceptible to a problem of the air flow separating from the diaphragm (films). In general, the air flow tends to separate when the film is deformed downward in a concave shape. The higher the air flow rate, the more likely this problem is to occur. Flow measurement is difficult beyond the point at which the separation occurs, where there tends to be an irregular vortex.

While a silicon nitride film tends to have a tensile stress, a silicon oxide film tends to have a compressive stress, and a platinum film in the device tends to have a tensile stress. When the sensor is designed according to equation 1, the resulting film tends to have a downward concavity. At high flow rates, the air flow tends to separate from the film, and accurate flow rate measurement becomes difficult.

The present invention addresses this issue by providing a flow sensor capable of highly precise flow rate measurement by preventing the separation of the air flow from the diaphragm.

SUMMARY OF THE INVENTION

To achieve this objective, the invention is a flow sensor, which includes upper insulating film layers and lower insulating film layers, and the average stress in the upper insulating film layers is more compressive than the average stress in the lower insulating film layers. The flow sensor includes a diaphragm, and the diaphragm is made of layers that include the insulating film layers. By making the average stress in the upper insulating film layers more compressive than that of the lower insulating film layers, the diaphragm will either remain flat or will deform in the upward direction, which permits accurate flow rate measurements at high flow rates.

DETAILED DESCRIPTION OF THE PREFERRED EMBODIMENTS

First Embodiment

Figure 1A:
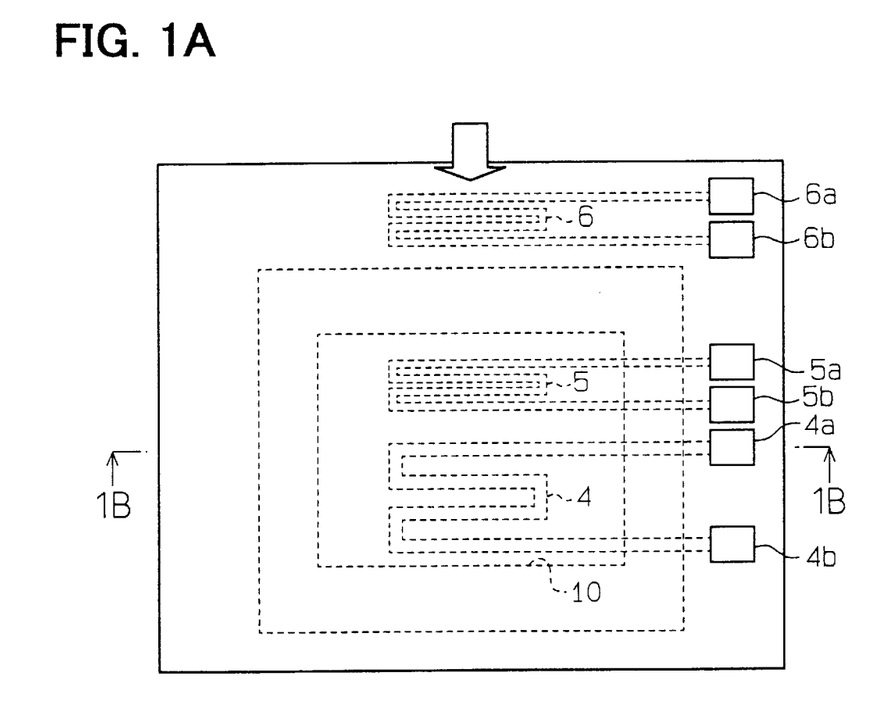
FIG. 1A is a diagrammatic plan view showing the flow sensor of the present invention.

FIG. 1A shows a heat-sensitive flow sensor of one embodiment. On a top surface of a single crystal silicon substrate (semiconductor substrate) 1 is a silicon nitride film 2, on top of which is a silicon oxide film 3. The films 2, 3 are formed across the entire top surface of the substrate 1. Furthermore, devices 4, 5 are placed on top of the silicon oxide film 3. The devices 4, 5 are made of thin metallic films (low-resistance material). More specifically, the films are platinum. The devices include a heater 4 (exothermic device), and a temperature sensor 5. The devices 4, 5 are placed at the center of the top surface of the substrate 1. Furthermore, a flow thermometer 6 is placed on the silicon oxide film 3 in a peripheral part of the substrate top surface. The flow thermometer 6 is also made of a platinum film. The relative positions of the heater 4, the temperature sensor 5, and the flow thermometer 6 are such that the heater 4 is on a downstream side and the flow thermometer 6 is on an upstream side. The direction of the flow of fluid is indicated by an arrow in FIG. 1A. The temperature sensor 5 is placed between the heater 4 and the flow thermometer 6. The heater 4, the temperature sensor 5, and the flow thermometer 6 are formed by strips of film, as shown.

Figure 1B:
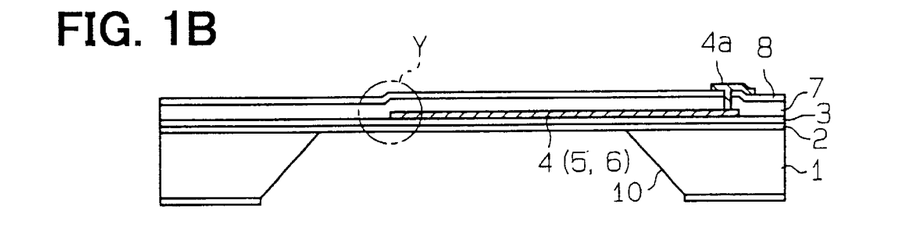
FIG. 1B is a diagrammatic cross sectional view taken along line 1B—1B of FIG. 1A.

Furthermore, a layer of silicon oxide film 7 is formed on the heater 4, the temperature sensor 5, and the flow thermometer 6, and a silicon nitride film 8 is formed on the silicon oxide film 7. The films 7, 8 are formed across the entire top surface of the substrate 1. The films 7, 8 cover the heater 4, the temperature sensor 5, and the flow thermometer 6.

An opening, or cavity, 10, which passes through the single crystal silicon substrate 1, is formed at the center of the single crystal silicon substrate 1. The heater 4 and the temperature sensor 5 are positioned over the opening 10, and the flow thermometer 6 is located outside of the perimeter of the opening 10. The opening 10 is formed by etching the backside of the substrate 1. The strips that form the heater 4 and the temperature sensor 5 extend from within the perimeter of the opening 10 to a location outside the perimeter of the opening 10. Pads (electrical contacts) 4a and 4b for the heater 4, pads 5a and 5b for the temperature sensor 5, and pads 6a and 6b for the flow thermometer 6 are formed at the periphery of the silicon substrate 1 on the silicon nitride film 8. The pads 4a, 4b, 5a, 5b, 6a, and 6b are accessible and can be attached to bonding wires (connection leads).

In this example, the silicon nitride film 2 and the silicon oxide film 3 make up a lower insulating film, while the silicon oxide film 7 and the silicon nitride film 8 make up an upper insulating film. The outermost layer of the multi-layer structure of the lower insulating film layers, which includes the silicon nitride film 2 and the silicon oxide film 3, is the silicon nitride film 2. The outermost surface of the multi-layer structure of the upper insulating film layers, which includes the silicon oxide film 7 and the silicon nitride film 8, is the silicon nitride film 8, which is also a passivation film.

The present flow sensor includes the lower insulating films 2, 3, which are on the top surface of the silicon substrate 1, the devices 4, 5, which are on top of the lower insulating films 2, 3, and the upper insulating film layers 7, 8, which are on top of the devices 4, 5. Furthermore, the opening 10 is formed in the silicon substrate 1 beneath the devices 4, 5. Furthermore, in this example, the lower insulating films 2, 3 and the upper insulating films 7, 8, which sandwich the devices 4, 5, make up a diaphragm formed at the upper end of the opening 10.

The operation of the flow sensor is as follows:

In this type of heat-sensitive flow sensor, the air temperature is first measured based on the resistance in the metallic interconnect lines that make up the flow thermometer 6. A voltage is then applied to the heater 4 with an appropriate feedback control to produce a heater temperature that is higher than the air temperature detected by the flow thermometer 6, by a prescribed level (for example, 200° C.). As the air flows, the temperature of the temperature sensor 5, which is placed on the upstream side with respect to the heater, decreases because the temperature sensor 5 loses heat. The temperature of the temperature sensor 5 is detected by detecting its resistance, which can be used to determine the flow rate of the air.

The temperature of the heater 4 is increased above that of the flow thermometer 6 by a prescribed level to accurately detect the air flow rate even when the temperature of the air changes (in other words, for improving the thermal characteristics). If, however, the temperature of the air is known to be constant in a particular application, the flow thermometer 6 and the accompanying feedback control would be unnecessary.

Although the heater 4 is placed on the downstream side of the temperature sensor 5 in this example, the heater 4 may also be placed on the upstream side of the temperature sensor 5. Furthermore, the temperature sensor 5 may be placed on the upstream or the downstream side. In fact, the position of the temperature sensor 5 can be anywhere, as long as the temperature at the position of the temperature sensor 5 changes with the flow.

Figure 2:
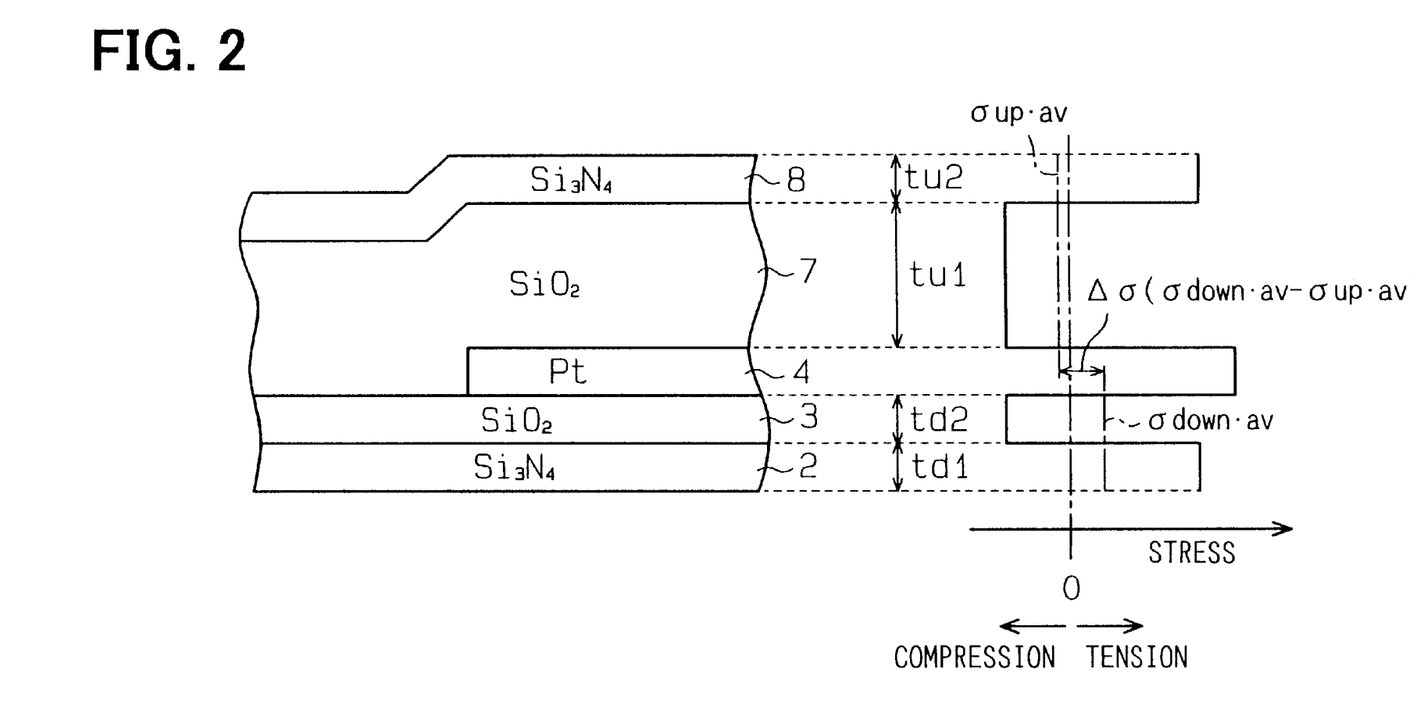
FIG. 2 is a diagram showing an enlargement of the window Y in FIG. 1B and a graphical representation of stress distribution at the location of the window Y.

Key characteristics of the flow sensor of the present embodiment are as follows:

The left part of FIG. 2 is an enlarged view of the region encircled by window Y in FIG. 1B. In this view, td1 is thickness of the silicon nitride film 2 in the lower insulating film layers, td2 is thickness of the silicon oxide film 3 in the lower insulating film layers, tu1 is thickness of the silicon oxide film 7 in the upper insulating film layers, and tu2 is thickness of the silicon nitride film 8 in the upper insulating film layers. The film thickness td1 of the silicon nitride film 2 is equal to the film thickness tu2 of the silicon nitride film 8 (td1=tu2), and the film thickness tu1 of the silicon oxide film 7 is greater than film thickness td2 of the silicon oxide film 3 (tu1>td2). More specifically, (tu1/td2)>1.22. When this condition is met, the average stress $\sigma_{up\cdot av}$ in the upper insulating film layers 7, 8 is more compressive than the average stress $\sigma_{down\cdot av}$ in the lower insulating film layers 2, 3 by $\Delta\sigma$.

More specifically, the film thicknesses are 0.12 μm for the film thickness td1 of the silicon nitride film 2; 0.3 μm for the film thickness td2 of the silicon oxide film 3; 0.7 μm for the film thickness td1 of the silicon oxide film 7; and 0.12 μm for the film thickness tu2 of the silicon nitride film 8.

The average stress $\sigma_{av}$ in a film can be expressed by the following equation 2, when the film has a multi-layered structure with n number of layers (n=1, 2, 3, . . . ), the thickness of each layer is t1, t2, . . . , tn, and the stress in each film is σ1, σ2, . . . σn.

$$\sigma_{av} = \frac{1}{t1 + t2 + \ldots + tn}(t1 \times \sigma1 + t2 \times \sigma2 + \ldots + tn \times \sigma n)$$

In a single layer film (n=1), the average stress $\sigma_{av}$ is σ1. The average stress $\sigma_{up\cdot av}$ in the upper insulating film layers 7, 8 is compressive, the average stress $\sigma_{down\cdot av}$ in the lower insulating film layers 2, 3 is tensile. Furthermore, the average stress across the entire diaphragm, or the stress in the insulating films (films 2, 3, 7, and 8) on the upper side and the lower side of the devices 4, 5 is slightly tensile.

Therefore, the stress in the silicon oxide film is compressive, the stress in the silicon nitride film is tensile, the stress in the upper insulating film layers is compressive, the stress in the lower insulating film layers is tensile, and the average stress across the entire diaphragm is slightly tensile. The thicknesses td1, td2, tu1, and tu2 are adjusted to achieve such stress characteristics. As a result, the entire diaphragm forms a surface that is flat or that bows slightly upward in a convex manner (from a perspective above the device). Air flowing above such a surface does not separate from the surface. Air flow measurements are thus possible even at high flow rates.

Another approach to preventing deformation in the film (diaphragm) is to increase the thickness of the films. However, a large amount of heat would flow from the heater 4 through the film (diaphragm), which would result in greater power consumption. Furthermore, when the entire diaphragm (the set of films) is under a strong tensile stress, the diaphragm is more easily damaged. When the diaphragm is under a compressive stress, the diaphragm can buckle. Therefore, a low level of tensile stress is optimal.

It is possible to design a flow sensor capable of making measurements even at high flow rates without adversely affecting the stress, strength, and reliability (resistance to pressure, resistance to etching, and durability) of the diaphragm, while keeping the total film thicknesses (td1+ tu2) of the nitride films above and below the devices 4, 5 the same, by adjusting the stress distribution within the diaphragm without changing the average stress and the total thickness of the diaphragm (td1+td2+tu1 +tu2).

Figure 3A:
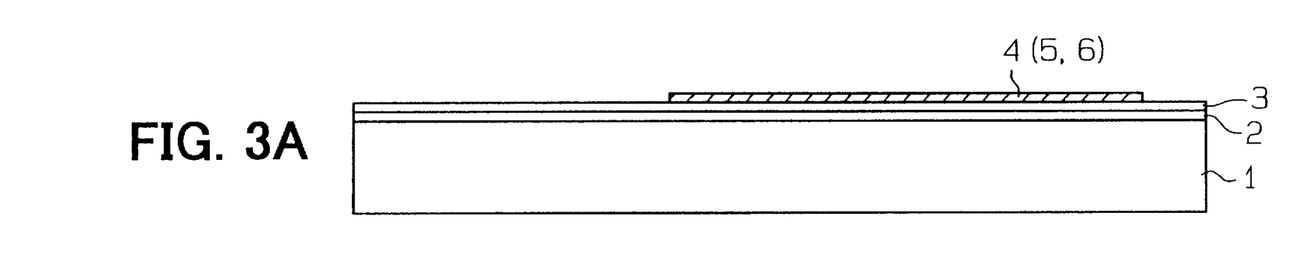
FIGS. 3A–3C are diagrammatic cross-sectional views showing sequential manufacturing steps of the flow sensor of FIG. 1A.

FIGS. 3A–3C and 4A–4C show the steps of a method of manufacturing the flow sensor. As shown in FIG. 3A, the silicon nitride film 2 for the lower insulating film layers is formed on the upper surface of the single crystal silicon substrate 1, and the silicon oxide film 3 is formed on top of the silicon nitride film 2. Next, the platinum film, which is 2000 Angstroms thick, for the heater 4, the temperature sensor 5, and the flow thermometer 6 is formed by vapor phase deposition. In addition, a titanium layer, which is 50 Angstroms thick (not shown in the figures), is deposited as an adhesion layer beneath the platinum film. Then, the platinum film is patterned by etching to form the heater, the thermometer, and the flow thermometer into prescribed shapes.

Figure 3B:
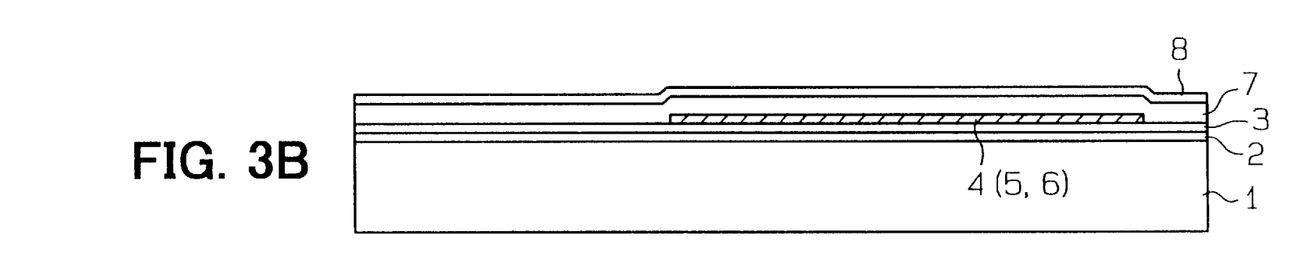

Then, as shown in FIG. 3B, the silicon oxide film 7 for the upper insulating film layers is formed above the silicon oxide film 3, as well as over the heater 4, the temperature sensor 5, and the flow thermometer 6. The silicon nitride film 8, also for the upper insulating film layers, is then formed on top of the silicon oxide film 7. The upper insulating film layers 7, 8 are formed such that the average stress in the upper insulating film layers 7, 8 is more compressive than the average stress in the lower insulating film layers 2, 3. In other words, at least one of the steps for forming the upper insulating film layers 7, 8 and the steps for forming the lower insulating film layers 2, 3 includes steps for forming a multi-layer structure of a silicon nitride film and a silicon oxide film. In the steps for forming a multi-layer structure of the silicon nitride film and the silicon oxide film, the silicon nitride films 2, 8 are formed at the topmost surfaces, and the film thickness tu1 of the silicon oxide film 7 in the upper insulating film layers 7, 8 is thicker than the film thickness td2 of the silicon oxide film 3 in the lower insulating film layers 2, 3. Specifically, these films should be formed such that (tu1/td2)>1.22.

Figure 3C:
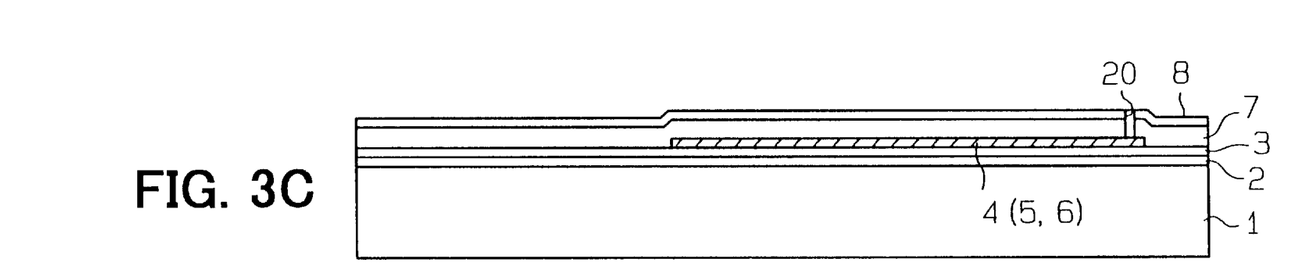

Then, as shown in FIG. 3C, a part of the upper insulating film layers 7, 8 is etched and removed to form a contact hole 20.

Figure 4A:
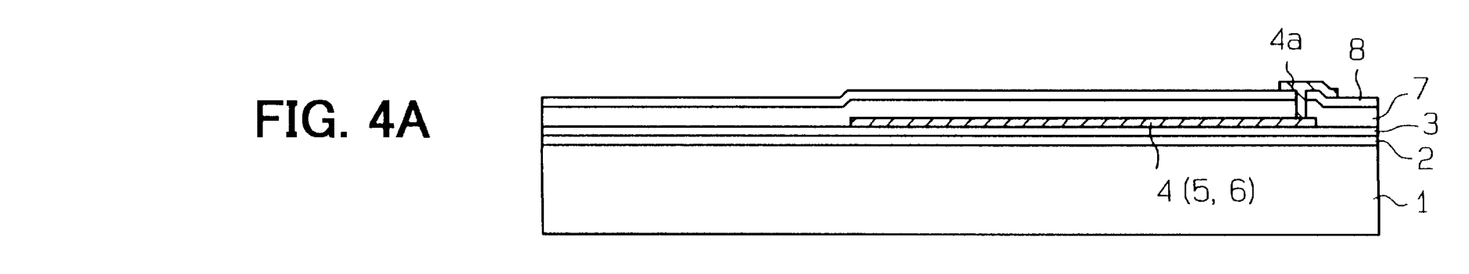
FIGS. 4A–4C are diagrammatic cross-sectional views showing further sequential manufacturing steps of the flow sensor of FIG. 1A.
Figure 4B:
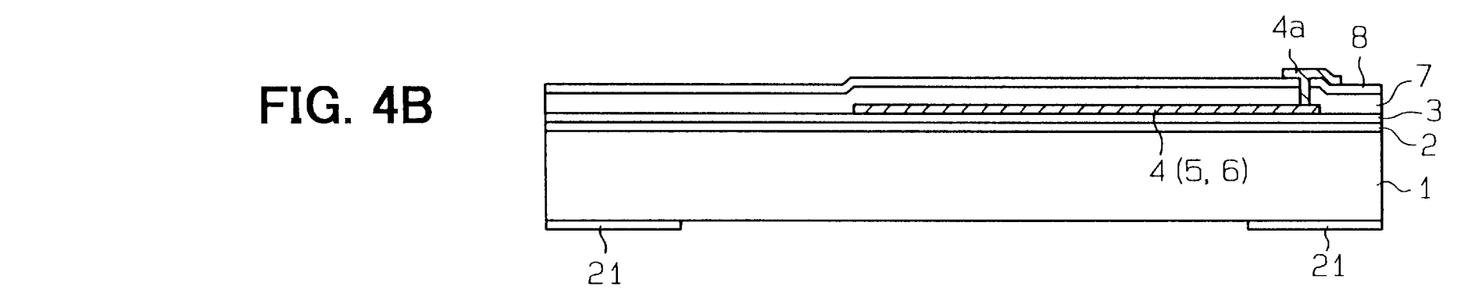

After a layer of gold, which is 5000 Angstroms thick, is vapor phase deposited across the entire surface, extraneous parts are etched and removed (or patterned), as shown in FIG. 4A, to form the pads 4a, 4b, 5a, 5b, 6a, and 6b. As shown in FIG. 4B, the film 21, which is either a silicon nitride film or a silicon oxide film, is deposited on the backside of the substrate 1. A prescribed part of this film 21 is etched and removed. The film 21 functions as a mask for etching silicon from the backside of the substrate.

Figure 4C:
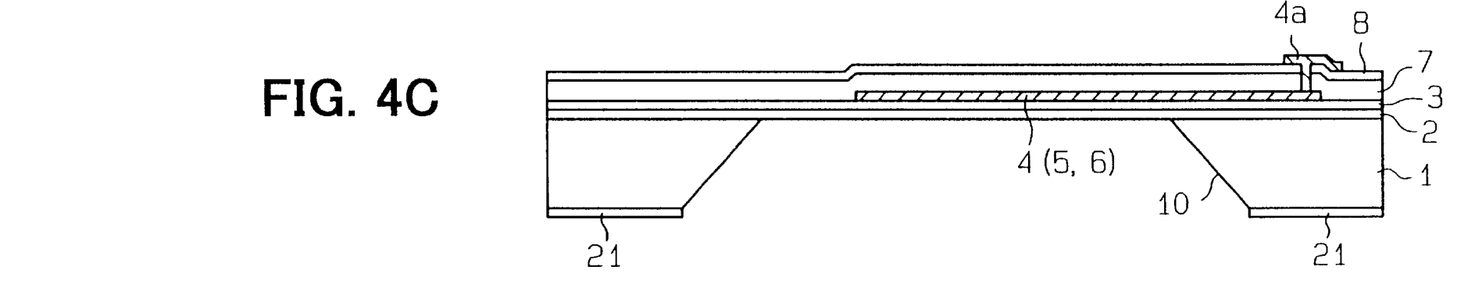

As shown in FIG. 4C, the backside of the silicon substrate 1 is etched anisotropically using a TMAH solution or a KOH solution to form the opening 10. To avoid damage to the side of the silicon substrate 1 that does not get etched (upper surface in the figure), the upper surface of the substrate might be covered by a protective film made of a material such as resist during etching.

With the steps described above, the flow sensor in FIGS. 1A and 1B can be manufactured. In the next section, simulation results of stress distribution across the films are discussed.

Figure 5:
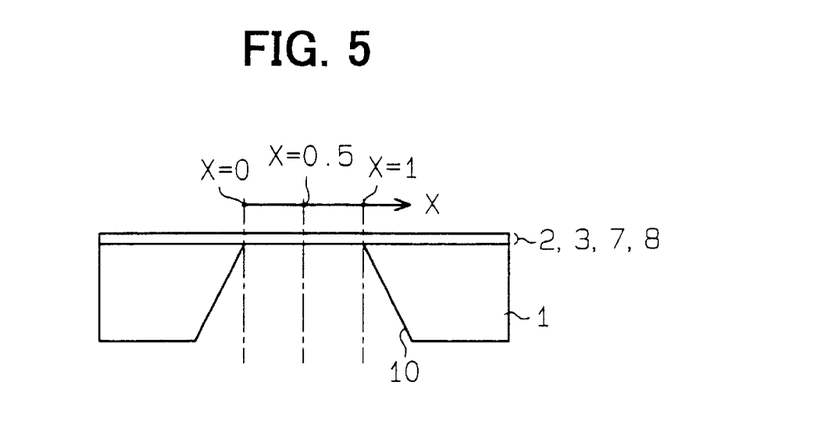
FIG. 5 is a diagrammatic side view of a device used for simulations.

As shown in FIG. 5, in the simulations, edge locations of the opening 10 are fixed (x=0, x=1), and the magnitudes of deflection of the devices 4, 5 in the up and down, or vertical, direction is calculated at the center (x=0.5) of the opening 10.

Figure 6A:
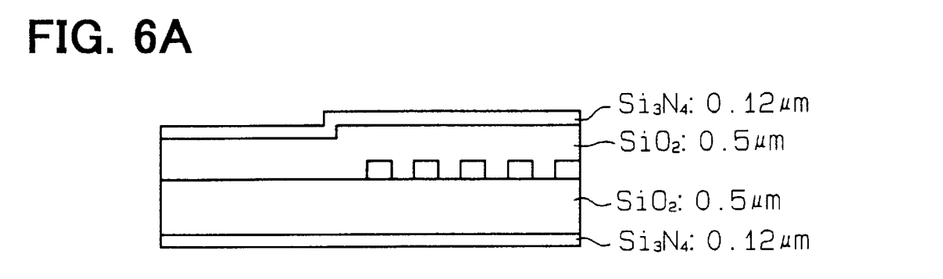
FIG. 6A is a cross sectional diagram illustrating a section of a device like that of FIG. 5 used in a simulation.
Figure 7A:
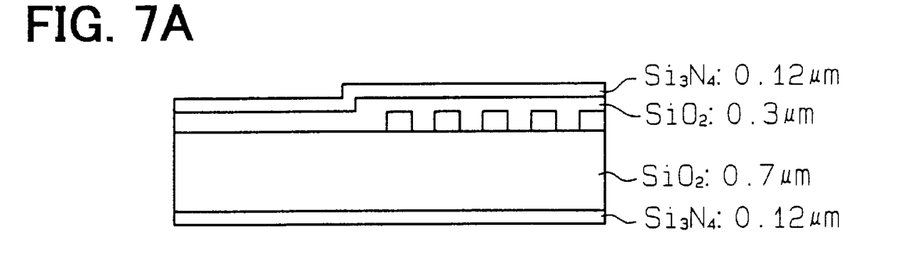
FIG. 7A is a cross sectional diagram illustrating a section of a device like that of FIG. 5 used in a simulation.
Figure 8A:
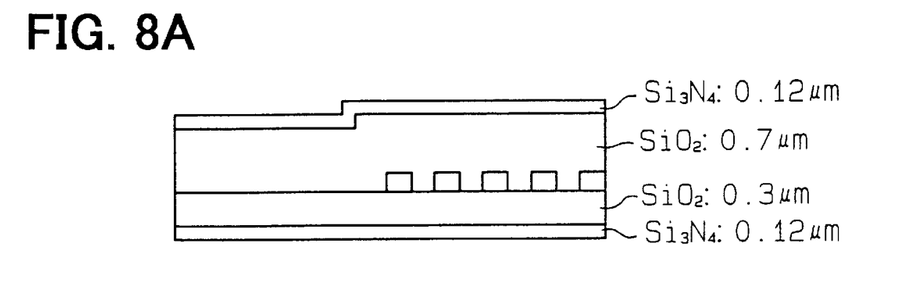
FIG. 8A is a cross sectional diagram illustrating a section of a device like that of FIG. 5 used in a simulation.

There were three sets of conditions for film thicknesses, as shown in FIGS. 6A, 7A, and 8A. Under the first set of conditions, as shown in FIG. 6A, in the upper insulating film layers, the silicon nitride film was 0.12 μm thick and the silicon oxide film was 0.5 μm thick. In the lower insulating film layers, the silicon oxide film was 0.5 μm thick, and the silicon nitride film was 0.12 μm thick.

Under the second set of conditions, as shown in FIG. 7A, in the upper insulating film layers, the silicon nitride film was 0.12 μm thick, and the silicon oxide film was 0.7 μm thick. In the lower insulating film layers, the silicon oxide film was 0.3 μm and the silicon nitride film was 0.12 μm thick.

Under the third set of conditions, as shown in FIG. 8A, in the upper insulating film layers, the silicon oxide film was 0.7 μm thick, and the silicon nitride film was 0.12 μm thick. In the lower insulating film layers, the silicon nitride film was 0.12 μm thick, and the silicon oxide film was 0.3 μm thick.

The average stress levels in the diaphragm were the same under all three sets of conditions, since the diaphragm has a weak tensile stress. Under the first set of conditions (FIG. 6A), the stress in both the upper films and the lower films was slightly tensile. Under the second set of conditions (FIG. 7A), the stress in the upper film was tensile, and the stress in the lower film was compressive. Under the third set of conditions (FIG. 8A), the stress in the upper film was compressive, and the stress in the lower film was tensile.

Figure 6B:
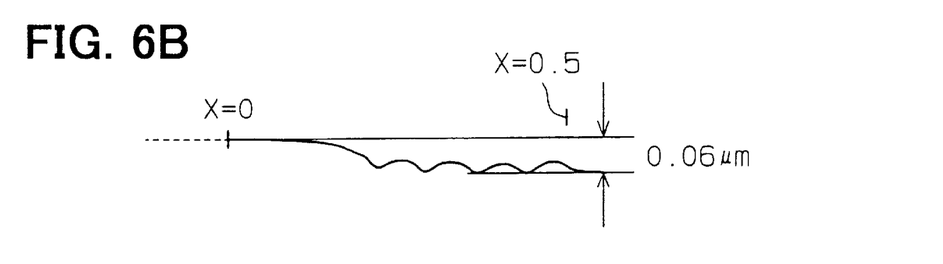
FIG. 6B is a diagram illustrating diaphragm deformation under the conditions of FIG. 6A.
Figure 7B:
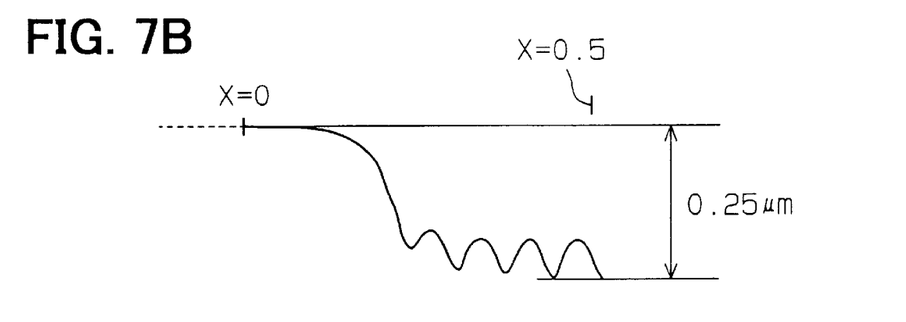
FIG. 7B is a diagram illustrating diaphragm deformation under the conditions of FIG. 7A.
Figure 8B:
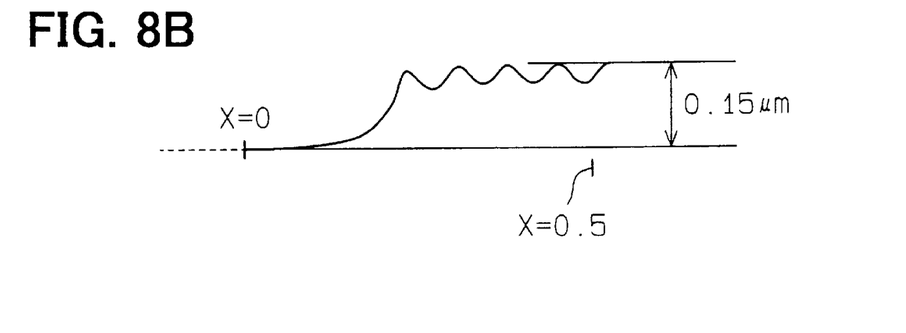
FIG. 8B is a diagram illustrating diaphragm deformation under the conditions of FIG. 8A.

The conditions of the first set of conditions of FIG. 6A are comparable to those of the device of Japanese unexamined patent publication Hei 11-194043. In this case, the diaphragm is bowed or deformed downward in a concave manner (from a perspective above the device), as shown in FIG. 6B. The locations indicated by the symbol X in FIG. 6B correspond to those in FIG. 5. The magnitude of deformation (displacement) was 0.06 μm. Under the second set of conditions of FIG. 7A, the total film thickness of the nitride films and the oxide film is the same, as under the first set of conditions. However, the upper oxide film is thinner than the lower oxide film. In this instance, as shown in FIG. 7B, the diaphragm is deformed further down compared with the device of the first set of conditions (FIG. 6A), and the magnitude of deformation (displacement) was 0.25 μcm. Under the third set of conditions of FIG. 8A, which are comparable to those of the device of the present embodiment, the upper oxide film is thicker than the lower oxide film. In this instance, as shown in FIG. 8B, the diaphragm is deformed upward in a convex manner. The magnitude of the deformation was 0.15 μm.

Figure 9:
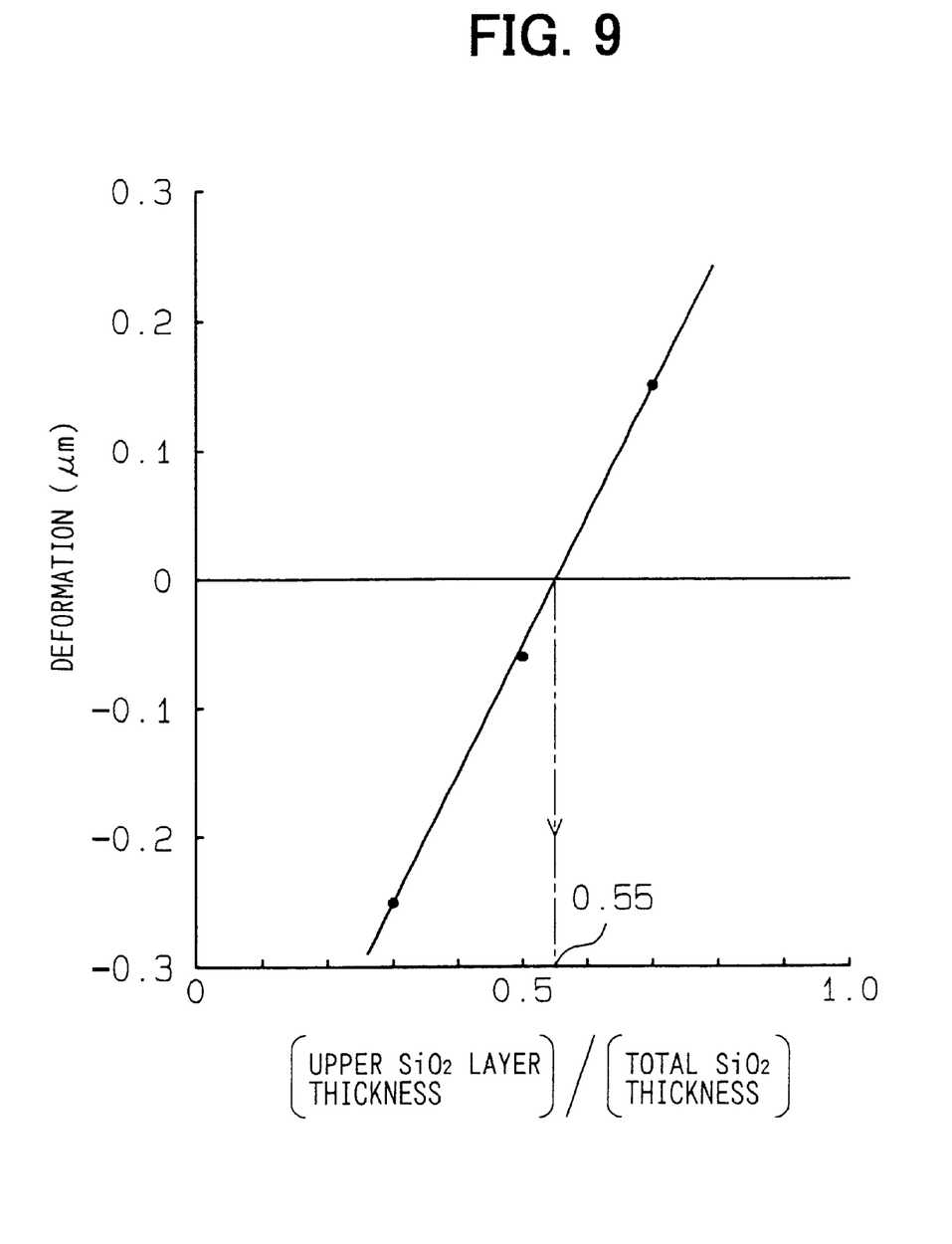
FIG. 9 is a graph illustrating the results of simulations under the conditions of FIGS. 6A, 7A, and 8A.

FIG. 9 summarizes data from the device simulation results. The X-axis in FIG. 9 represents the following ratio:

(thickness of the silicon oxide film in the upper insulating film layers)/(total thickness of the silicon oxide film in the lower insulating film layers and the silicon oxide film in the upper insulating film layers)

The Y-axis represents the magnitude of deformation at the center of the diaphragm. FIG. 9 plots the measured deformation magnitudes under all three sets of conditions and also shows a linear fitting, by the least square method, of the plotted points. When the magnitude of deformation is zero on the linear approximation line by the least square fitting method, the X-axis value is 0.55. Therefore, the diaphragm bows upward in a convex manner or remains flat when the following is true:

(thickness of the silicon oxide film in the upper insulating film layers)/(thickness of the silicon oxide film in the lower insulating film layers)>1.22 ((0.55/(1−0.55))=1.22).

Figure 10A:
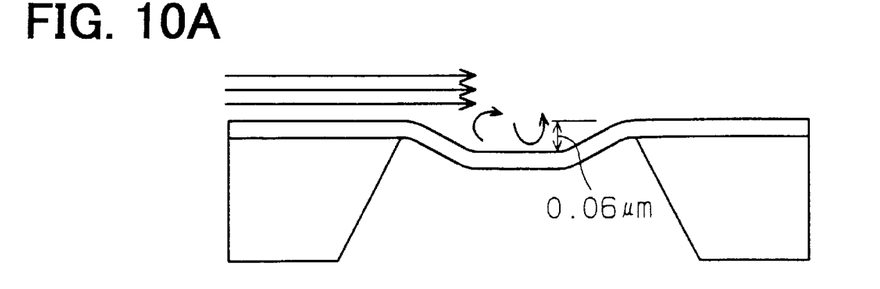
FIGS. 10A–10C are a cross sectional diagrams illustrating simulations under various respective conditions.

Under the first set of conditions of FIG. 6A, the air flow becomes separated at high flow rates, as shown in FIG. 10A. In other words, when the oxide films in the upper and lower layers have the same film thicknesses, the films bow downward, causing an air flow separation at high flow rates. Under the second set of conditions of FIG. 7A, the magnitude of bowing is even larger than that under the first set of conditions, and the flow separation occurs at a smaller flow rate than under the first set of conditions.

Figure 10B:
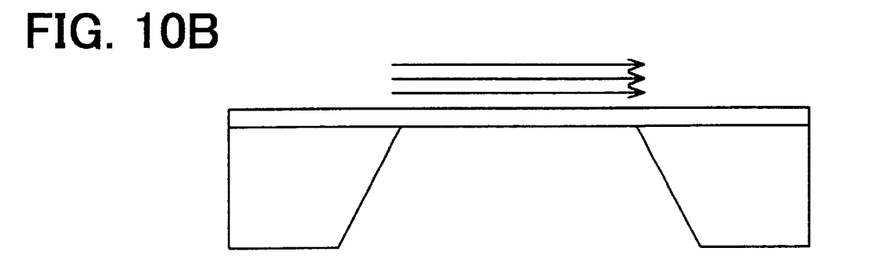
Figure 10C:
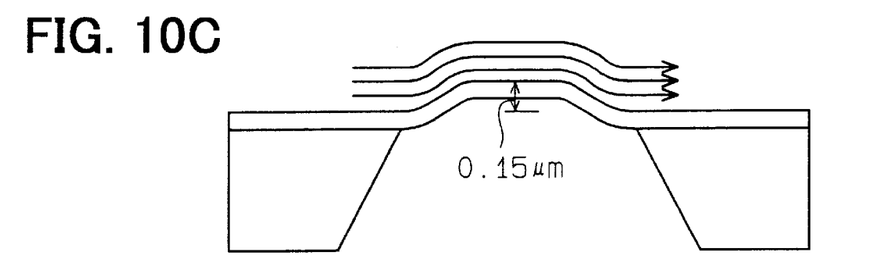

On the other hand, under the third set of conditions of FIG. 8A, the films bow upward, and the flow does not separate, as shown in FIG. 10C. Thus, flow rate measurement is possible even at high flow rates. By making the oxide film in the upper layer thicker than the oxide film in the lower layer, it is possible to make the diaphragm (the films) bow upward to prevent separation even at high flow rates. Furthermore, when the magnitude of bowing in the vertical direction of the drawings is zero, there is no separation, as shown in FIG. 10B, and flow rate measurements are possible even at high air flow rates.

Increased stability is ensured with the device of Japanese unexamined patent publication Hei 11-194043 by having a weak tensile stress in both the upper and lower films of the device and having a weak tensile stress on average in the entire diaphragm. With such a device, the simulation results in FIG. 9 show that the diaphragm would bow downward. On the other hand, in the present embodiment, the entire film has the same weak tensile stress, but bowing is controlled by appropriately adjusting the stress distribution in the films.

As explained thus far, it is possible to make the diaphragm bow upward or remain flat without increasing the thickness of the diaphragm by modifying the film thickness distributions inside the diaphragm between the film above the device and the film below the device, while maintaining an average tensile stress to prevent the air flow from separating, even at high flow rates, and to ensure that the flow sensor can measure flow rates even at higher flow rates.

As explained thus far, the flow sensor of the present embodiment has the following characteristics.

As shown in FIG. 2, the average stress $\sigma_{up\text{-}av}$ in the upper insulating film layers 7, 8 is more compressive compared with the average stress $\sigma_{down\text{-}av}$ in the lower insulating film layers 2, 3. As a result, the upper and lower insulating films 2, 3, 7, and 8 that sandwich the devices 4, 5 from above and below do not bow downward at the point where the devices 4, 5 are positioned, and separation of the air flow, normally observed with a downward bowing diaphragm, is prevented. In other words, the diaphragm either does not bow or bows upward at the point where the devices 4, 5 are positioned. Because the air flow separation is controlled at the point where the devices 4, 5 are positioned, highly precise flow rate measurements are possible.

As shown in FIG. 2, at least one of the upper insulating film layers and the lower insulating film layers includes a multi-layer structure that includes a silicon nitride and a silicon oxide film. Furthermore, by placing the silicon nitride films 2, 8 at the outermost layers of the multi-layer structures of the silicon nitride and silicon oxide films, it is possible to have the silicon nitride films 2, 8 function as surface passivation layers.

As shown in FIG. 2, because the thickness tu1 of the silicon oxide film 7 in the upper insulating film layers is larger than the thickness td2 of the silicon oxide film 3 in the lower insulating film layers, the average stress $\sigma_{up\text{-}av}$ in the upper insulating film layers is more compressive compared with the average stress $\sigma_{down\text{-}av}$ in the lower insulating film layers.

More specifically, the results in FIG. 9 show that, when the relationship between the thickness tu1 of the silicon oxide film 7 in the upper insulating film layers and the thickness td2 of the silicon oxide film 3 in the lower insulating film layers is such that (tu1/td2)>1.22, it is possible to further ensure that the diaphragm (films) bow upward or remain flat at the location where the devices 4, 5 are positioned.

The devices 4, 5 should include materials that have tensile stress, such as platinum.

Additional examples will be described next.

In addition to the silicon oxide films and silicon nitride films, alumina ($Al_2O_3$), SiON, $TiO_2$, $Ta_2O_5$ and MgO films may be used (each on its own) for the insulating films. Combinations of these films in multi-layer films may also be used.

Other materials, besides platinum, that may be used for the devices 4, 5 are polysilicon, NiCr, TaN, SiC, and W.

Figure 11:
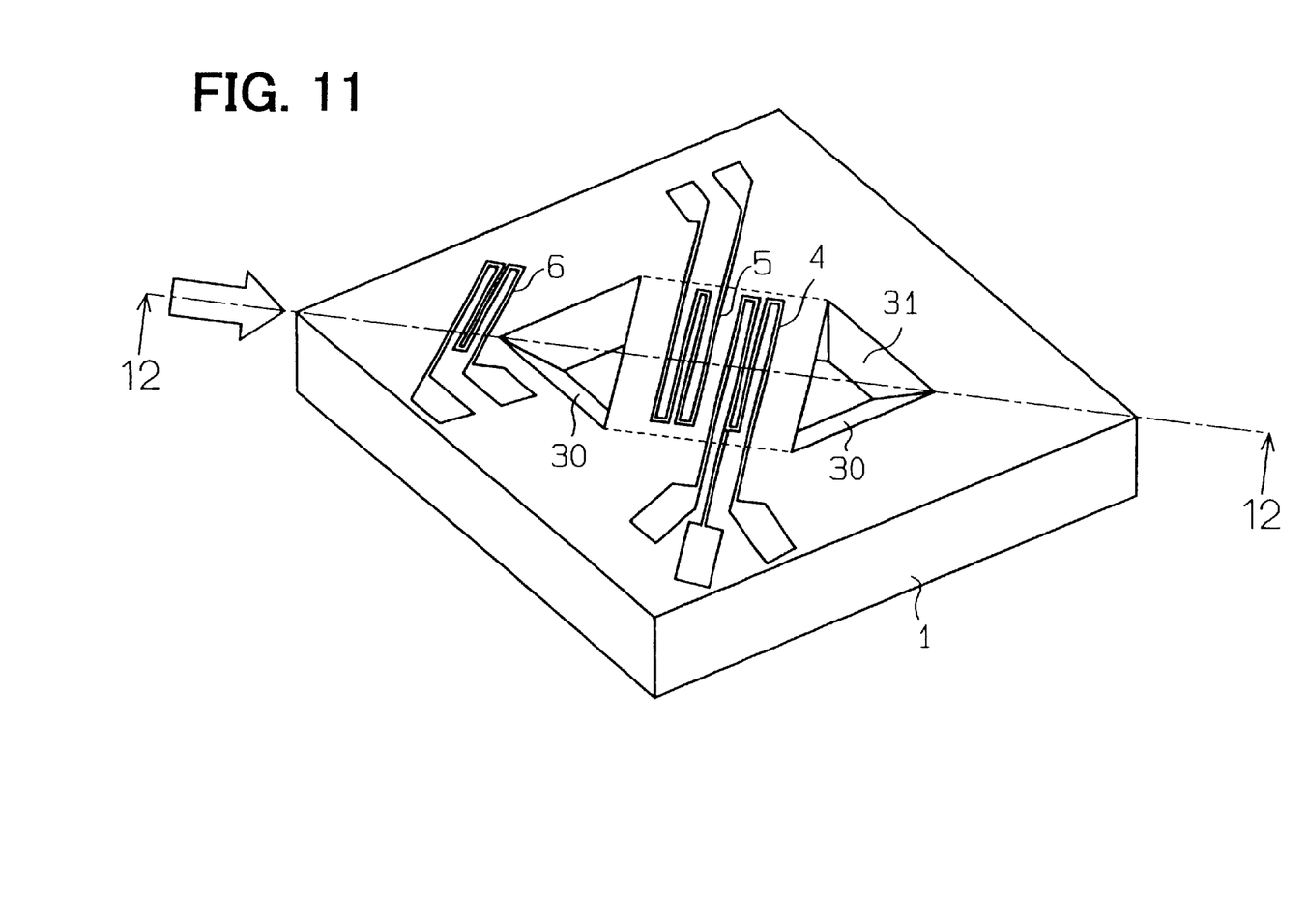
FIG. 11 is a diagrammatic perspective view illustrating a variation of the flow sensor.
Figure 12:
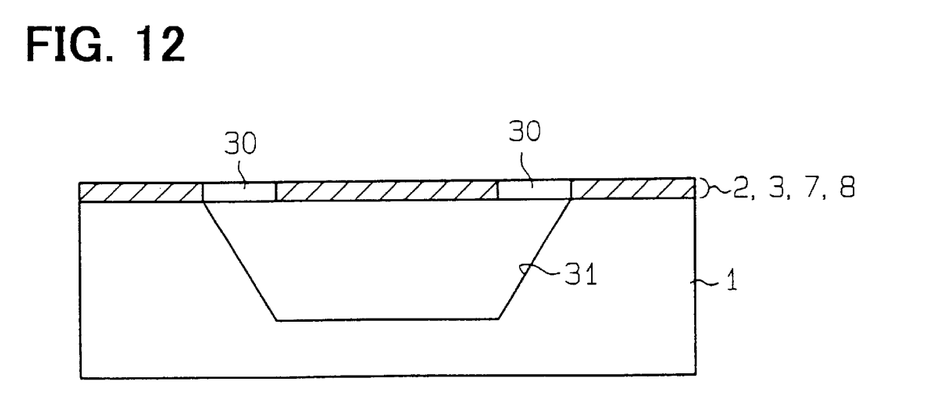
FIG. 12 is a cross-sectional view taken along the line 12—12 in FIG. 11.

Furthermore, the flow sensor is not limited to the one shown in FIGS. 1A and 1B and can be bridge shaped, such as those shown in FIGS. 11 and 12. Films 2, 3, 7, and 8, which include slits 30, are formed on the top surface of a silicon substrate 1. A recess, or cavity, 31 is formed on the silicon substrate 1 below the slits 30 for the sensor.

What is claimed is:

1. A flow sensor comprising:
 a set of lower insulating films formed on a top surface of a semiconductor substrate;
 at least one electric device placed on the lower insulating films;
 a set of upper insulating films formed on the devices; and
 a cavity formed in the semiconductor substrate below the devices, wherein the average stress in the upper insulating film layers is more compressive than the average stress in the lower insulating film layers.

2. The flow sensor of claim 1 wherein at least one of the set of upper insulating film layers and the set of lower insulating film layers includes a silicon nitride film and a silicon oxide film.

3. The flow sensor of claim 2 wherein the silicon nitride film is the outermost film of the at least one set.

4. The flow sensor of claim 3, wherein both sets of films include a silicon oxide film, and the thickness of the silicon oxide film in the set of upper insulating film layers is greater than the thickness of the silicon oxide film in the set of lower insulating film layers.

5. The flow sensor of claim 4 wherein the ratio of the film thickness of the silicon oxide film in the upper insulating film layers to the film thickness of the silicon oxide film in the lower insulating film layers is greater than 1.22.

6. The flow sensor of claim 1 wherein the device is under tensile stress.

7. The flow sensor of claim 1, wherein the device is made of a material containing platinum.

8. The flow sensor of claim 1, wherein both sets of films include a silicon oxide film, and the thickness of the silicon oxide film in the set of upper insulating film layers is greater than the thickness of the silicon oxide film in the set of lower insulating film layers.

9. The flow sensor of claim 8 wherein the ratio of the film thickness of the silicon oxide film in the upper insulating film layers to the film thickness of the silicon oxide film in the lower insulating film layers is greater than 1.22.

10. The flow sensor of claim 1, wherein the average stress in the upper insulating film layers is compressive and the average stress in the lower insulating film layers is tensile.

11. The flow sensor of claim 1, wherein both the set of upper insulating film layers and the set of lower insulating film layers include silicon nitride films, respectively.

12. The flow sensor of claim 10, wherein both the set of upper insulating film layers and the set of lower insulating film layers include silicon nitride films, respectively.

13. The flow sensor of claim 1, wherein both the set of upper insulating film layers and the set of lower insulating film layers include silicon oxide films, respectively, the silicon oxide film in the set of upper insulating film layers is thicker than that in the set of lower insulating film layers, and the silicon nitride films are provided as outermost layers in each of the upper insulating film layers and the lower insulating film layers.

14. A flow sensor comprising:
   a set of lower insulating films formed on a top surface of a semiconductor substrate;
   a patterned metallic heater or temperature sensor film placed on the lower insulating films;
   a set of upper insulating films formed on the devices and above the set of lower insulating films; and
   a cavity formed in the semiconductor substrate below the devices, wherein the thicknesses and materials of the sets of insulating films are predetermined such that the average stress in the upper insulating film layers is more compressive than the average stress in the lower insulating film layers.

15. The flow sensor of claim 14 wherein at least one of the set of upper insulating film layers and the set of lower insulating film layers includes a silicon nitride film and a silicon oxide film.

16. The flow sensor of claim 15 wherein the silicon nitride film is the outermost film of the at least one set.

17. The flow sensor of claim 14 wherein both sets of films include a silicon oxide film, and the thickness of the silicon oxide film in the set of upper insulating film layers is greater than the thickness of the silicon oxide film in the set of lower insulating film layers.

18. The flow sensor of claim 17 wherein the ratio of the film thickness of the silicon oxide film in the upper insulating film layers to the film thickness of the silicon oxide film in the lower insulating film layers is greater than 1.22.

19. The flow sensor of claim 14 wherein the patterned metallic film is under tensile stress.

20. The flow sensor of claim 14, wherein the patterned metallic film is made of a material containing platinum.

21. The flow sensor of claim 14 wherein the set of upper insulating film layers includes a silicon nitride film and a silicon oxide film, and the set of lower insulating film layers includes a silicon nitride film and a silicon oxide film.

22. The flow sensor of claim 10, wherein the silicon nitride film is the outermost film in each set of insulating film layers.

23. The flow sensor of claim 10, wherein the average stress in the upper insulating film layers is compressive and the average stress in the lower insulating film layers is tensile.

24. The flow sensor of claim 14, wherein both the set of upper insulating film layers and the set of lower insulating film layers include silicon oxide films, respectively, the silicon oxide film in the set of upper insulating film layers is thicker than that in the set of lower insulating film layers, and the silicon nitride films are provided as outermost layers in each of the upper insulating film layers and the lower insulating film layers.

* * * * *